United States Patent [19]

Atkinson

[11] Patent Number: 5,304,064
[45] Date of Patent: Apr. 19, 1994

[54] EDUCATIONAL GAME FOR TEACHING FREEHAND DRAWING

[76] Inventor: Suzanne Atkinson, 25 Oregon Ave., Mount Laurel, N.J. 08054

[21] Appl. No.: 974,926

[22] Filed: Nov. 12, 1992

[51] Int. Cl.⁵ .............. G09B 11/00; G09B 19/22; A63F 9/04
[52] U.S. Cl. .............. 434/85; 434/128; 273/146
[58] Field of Search .............. 434/85, 86, 128; 273/138 R, 139, 146

[56] References Cited

U.S. PATENT DOCUMENTS

| | | | |
|---|---|---|---|
| D. 60,526 | 3/1922 | Gayner | 273/146 X |
| 2,178,193 | 10/1938 | Wade | 273/146 X |
| 3,568,356 | 3/1971 | Berman | 434/307 X |
| 3,858,333 | 1/1975 | Kopp | 434/112 X |
| 4,336,941 | 6/1982 | Haines | 273/240 |
| 4,976,647 | 12/1990 | Axtell | 446/151 |
| 5,249,808 | 10/1993 | Batté | 273/249 |

Primary Examiner—Gene Mancene
Assistant Examiner—Cindy A. Cherichetti
Attorney, Agent, or Firm—Simpson & Simpson

[57] ABSTRACT

An educational game that aids in the development of the fundamentals of freehand drawing and assists players of the game in learning the relationship between all of the parts that comprise a whole. According to the present invention, there is provided a drawing area, such as a sheet of paper, erasable form board, etc., having imprinted thereon a single image which, when combined with several other images drawn by a player, results in a fully completed picture. In conjunction with the drawing area, a die or other selectiion device is used to determine each players' opportunity to complete the picture. Each side of the die presents the player with a different option for proceeding.

4 Claims, 2 Drawing Sheets

EDUCATIONAL GAME FOR TEACHING FREEHAND DRAWING

BACKGROUND OF THE INVENTION

1. Field of the Invention

This invention relates to an educational game that aids in the development of the fundamentals of freehand drawing and assists players of the game in learning the relationship between all of the parts that comprise a whole.

2. Description of the Related Art

There are many games used for amusement or educational purposes that employ cubes, more commonly called dice. Frequently such games are used in conjunction with game boards, with the dice having assorted images or symbols on each of their sides. The players roll the dice, or a single die, and the symbol(s) that faces up is utilized by the player to determine where on the board to move or what step to take.

U.S. Pat. No. 3,876,207 to Jones discloses and educational game in which a spinner is used to indicate a particular "predetermined characteristic." Pieces corresponding to the predetermined characteristic are selected when indicated by the spinner and placed upon a game board having an outline of a character that is made up of the predetermined characteristics. Nothing in the Jones patent discloses the freehand drawing of characteristics by a player.

U.S. Pat. No. 3,858,333 to Kopp teaches an educational game apparatus for teaching sign language. The game disclosed in Kopp is played similarly to the game "SCRABBLE", and dice bearing the various letters of the sign language alphabet are used to determine which letters the player may use in an attempt to spell words.

U.S. Pat. No. 1,754,738 to Calle teaches another dice game in which a card, bearing a "connect-the-dots" or "dot-to-dot" drawing along with a table listing particular coordinates representing a line to be drawn, is used. Dice are used to determines which of the coordinates should be used by a player, which, therefore, determines which line will be drawn.

U.S. Pat. No. 4,158,921 to Stolpen teaches an educational teaching and self-correcting apparatus used for teaching relationships, similarities and differences in a number of subject matters. Depending on the roll of several different dice, the user learns to match similarities, differences and related items.

U.S. Pat. No. 3,568,356 to Berman teaches a game that is used, interactively, with a television set. The player puts a plastic film "panel" over the television screen and places various items on the screen to help tell a story. The player can also use special markers to draw on the screen and is directed to do so by instructions delivered by the television program announcer.

SUMMARY OF THE INVENTION

It is an object of the present invention to provide an instructional game that aids in the development of relational skills such as, for example, matching a particular body part with its appropriate location on a body.

It is another object of the present invention to provide an instructional game that aids in the development of the fundamentals of freehand drawing.

It is still a further object of the present invention to provide an instructional game that allows the player(s) to use his or her creativity in determining what, where and how to draw, freehand, a particular item specified by the roll of a die.

According to the present invention, there is provided a drawing area, such as a sheet of paper, erasable form board, etc., having imprinted thereon a single image which, when combined with several other images drawn by a player, results in a fully completed picture. In conjunction with the drawing area, a die or other selection device is used to determine each players' opportunity to complete the picture. In the case of a die side presents the player with a different option for proceeding.

These, together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
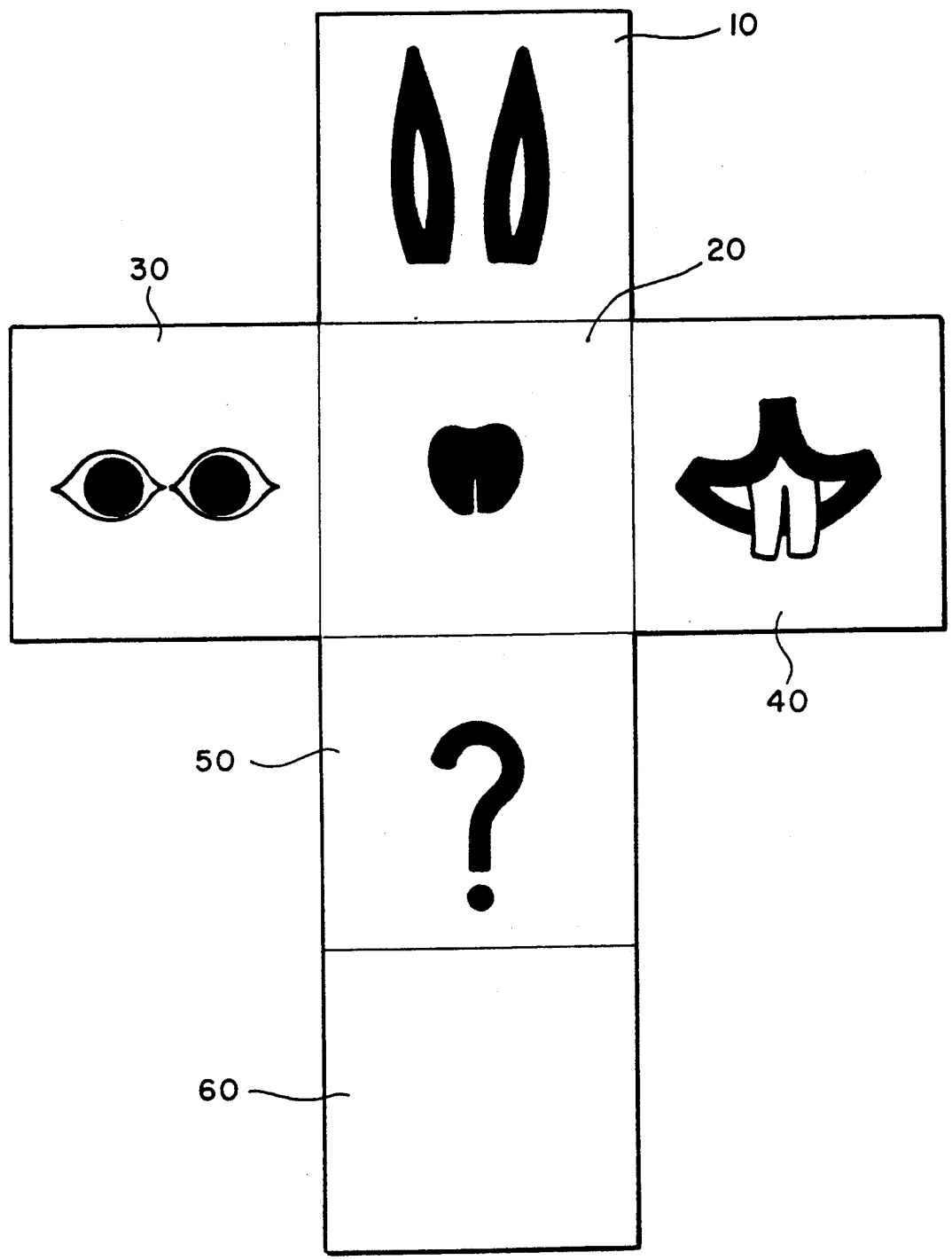
FIG. 1 is a developed view showing the relative positioning of the visual presentation of subject matter (images) on the surface of a geometric block in one example of the invention.

FIG. 1 is a developed view showing an example of one set of images that could appear on the sides of a six-sided die. The die could be any geometric shape, however, as long as it could be rolled to randomly select one of the sides. In this example, the images displayed on the sides of the die correspond to body parts of a rabbit. Specifically, side 10 displays the ears of a rabbit, side 20 displays the nose, side 30 displays the eyes and side 40 displays the mouth. In this particular example, side 50, showing a question mark, could be used to allow the player to choose any characteristic to draw on the drawing area (i.e., a "wild card"). Finally, side 60, which is blank, could be used to indicate the loss of turn for the player that rolls the blank.

Figure 2:
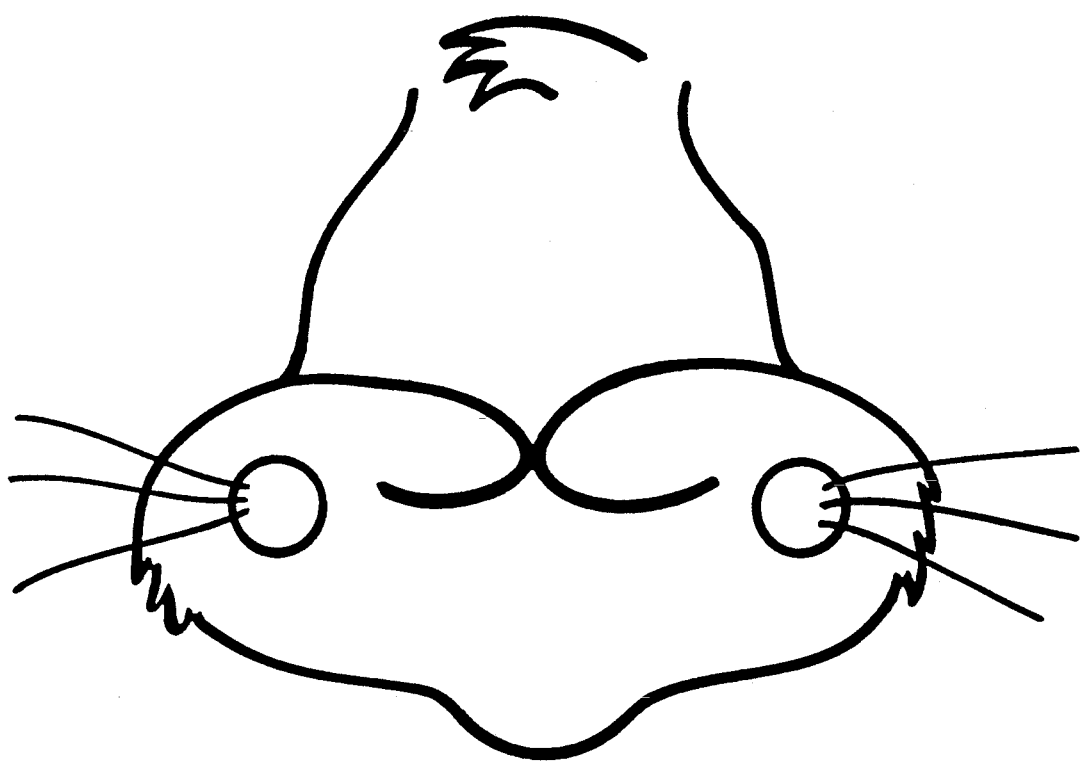
FIG. 2 is a view of an example of a drawing area in accordance with the present invention.

FIG. 2 illustrates a drawing area that could be used in conjunction with the die of FIG. 1. As can be seen in FIG. 2, the head of the rabbit, minus certain features, is portrayed. Hereinafter, such a partially completed picture will be generically called a "blank." The drawing area can be, for example, a sheet of paper with the blank printed on it. Any drawing surface that can have a blank printed on or otherwise placed on it will be sufficient.

To play the game, the first player rolls the die and, based upon the roll of the die, determines what his or her next move is. Assume, for example, that the player rolls the die and side 10, the ears of the rabbit, comes up. The player must first determine that the features displayed on side 10 are ears. Next, the player must determine where, on the blank, they belong. Finally, the player must draw the ears, in the appropriate spot on the blank, in freehand. The player then passes the die to the next player who goes through the same process. The winner of the game is the first player that completely fills in the features of the blank.

Each individual player can have their own drawing area with their own blank, and the game is then won by the first player to correctly complete his or her picture. Alternatively, a single drawing area could be used, with the winner being the player who draws the final image to complete the picture. An answer sheet, showing a correctly completed picture, could be included with the game, although participation and learning, as opposed to "winning", should be the stress of the game.

Obviously, the example shown in FIGS. 1 and 2 is only one of many depictions that could be used with this invention. Clowns, other animals, or cartoon characters are just a few alternative depictions that can be used. Further, the image comprising the "blank" could be included on the die, and the drawing area could be a blank sheet of paper. The advancement in the art is that the users will learn to identify body parts (as individual parts that collectively comprise a whole), learn to associate them with the appropriate location on the body as a whole, and will develop freehand drawing skills.

This game is particularly useful in schools and day care settings to teach young children, and can also be used, for example, at parties and the like to amuse children. Obviously, depending on the complexity of the drawings and the depictions on the die, this invention is not limited to amusing and teaching children, but could also be used to teach concepts and drawing skills to, or for therapy for, people of all ages.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

I claim:

1. A method of teaching freehand drawing skills and relationships using a selection device, a drawing area and a drawing implement, comprising the steps of:
   A. manipulating the selection device to determine a selected pictorial image to be drawn on the drawing area;
   B. identifying the selected pictorial image; and
   C. drawing, in freehand, the selected pictorial image in the appropriate location on the drawing area.

2. A method in accordance with claim 1 wherein which the selection device is a die.

3. A method of teaching freehand drawing skills and relationships using a selection device, a drawing area and a drawing implement, comprising the steps of:
   A. manipulating the selection device to determine a selected pictorial image to be drawn on the drawing area;
   B. identifying the selected pictorial image and determining its relationship to a blank image preprinted on the drawing area; and
   C. drawing, in freehand, the selected pictorial image in the appropriate location in reference to the blank image.

4. An educational teaching apparatus, comprising:
   at least one (1) geometrical block having a plurality of sides, said sides of said block having a visual presentation of pictorial images thereon;
   a drawing area having a blank image, corresponding to the visual presentation of pictorial images on said block, printed thereon; and
   a drawing implement, wherein a user of said apparatus rolls the geometrically shaped block, identifies the visually presented pictorial image that is displayed as a result of said roll, determines the relationship of said visually presented pictorial image to said blank image, and draws, in freehand, said visually presented pictorial image in the appropriate location with respect to said blank image.

* * * * *